(12) United States Patent
Figov

(10) Patent No.: US 12,190,867 B2
(45) Date of Patent: Jan. 7, 2025

(54) KEYWORD DETECTION FOR AUDIO CONTENT

(71) Applicant: Microsoft Technology Licensing, LLC, Redmond, WA (US)

(72) Inventor: Zvi Figov, Modiin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 17/804,603

(22) Filed: May 31, 2022

(65) Prior Publication Data

US 2023/0343329 A1 Oct. 26, 2023

Related U.S. Application Data

(60) Provisional application No. 63/363,283, filed on Apr. 20, 2022.

(51) Int. Cl.
*G10L 15/22* (2006.01)
*G06F 40/279* (2020.01)
*G06F 40/40* (2020.01)
*G10L 15/04* (2013.01)
*G10L 15/08* (2006.01)
*G10L 25/57* (2013.01)

(52) U.S. Cl.
CPC ............ *G10L 15/08* (2013.01); *G06F 40/279* (2020.01); *G06F 40/40* (2020.01); *G10L 15/04* (2013.01); *G10L 15/22* (2013.01); *G10L 25/57* (2013.01); *G10L 2015/088* (2013.01)

(58) Field of Classification Search
CPC ......... G10L 15/08; G10L 15/04; G10L 15/22; G10L 25/57; G10L 2015/088; G06F 40/279; G06F 40/20; G06F 40/40; G06F 40/30
See application file for complete search history.

(56) References Cited

U.S. PATENT DOCUMENTS

| 2020/0226154 A1* | 7/2020 | Muffat | G06N 5/04 |
| 2020/0401910 A1* | 12/2020 | Hassanzadeh | G06N 5/025 |
| 2021/0327413 A1* | 10/2021 | Suwandy | G06N 3/045 |

OTHER PUBLICATIONS

Grootendorst, et al., "KeyBERT: Minimal Keyword Extraction with BERT", Retrieved From: https://github.com/MaartenGr/KeyBERT, Oct. 27, 2020, 7 Pages.

(Continued)

*Primary Examiner* — Huyen X Vo

(57) ABSTRACT

Examples of the present disclosure describe improved systems and methods for detecting keywords in audio content. In one example implementation, audio content is segmented into one or more audio segments. One or more text segments is generated, each text segment corresponding to each of the audio segments. For each text segment, one or more phrase candidate values is generated using a textual analysis, and one or more sentence embedding values is generated using a sentence embedding analysis. Next, an average sentence embedding value is calculated using the one or more sentence embedding values. Each of the one or more phrase candidate values is compared to the average sentence embedding value. Each phrase candidate value having a comparison value above a threshold value is labeled as representing a keyword.

20 Claims, 8 Drawing Sheets

(56) References Cited

OTHER PUBLICATIONS

Sharma, et al., "Self-Supervised Contextual Keyword and Keyphrase Retrieval with Self-Labelling", In Publication of Preprints, Aug. 6, 2019, 6 Pages.
Papagiannopoulou, et al., "A Review of Keyphrase Extraction", In repository of arXiv:1905.05044v2, Jul. 30, 2019, 59 Pages.
"International Search Report and Written Opinion Issued in PCT Application No. PCT/US23/013442", Mailed Date: May 4, 2023, 9 Pages.
Smires, et al., "Simple Unsupervised Keyphrase Extraction using Sentence Embeddings", In repository of arXiv:1801.04470v3, Sep. 5, 2018, 9 Pages.

* cited by examiner

KEYWORD DETECTION FOR AUDIO CONTENT

CROSS-REFERENCE TO RELATED APPLICATIONS

This application claims the benefit of U.S. Provisional Patent Application No. 63/363,283, titled "Keyword Detection for Audio Content," filed Apr. 20, 2022, which is incorporated by reference herein in its entirety.

BACKGROUND

Keywords, and the identification of such, can play an important role in determining the broader concepts expressed through text data. Current systems and methods for extracting keywords from audio content utilize the entirety of the text data after audio content is broadcast to detect keywords. In this way, determining keywords from audio content can be done by first applying a speech to text model and a keyword detection model on all of the text present in the audio content.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Previous methods of extracting keywords from audio text present challenges to analyzing streaming multimedia content and to using on-device analysis models. Examples of the present disclosure describe improved systems and methods for detecting keywords in audio content. In one example implementation, audio content is segmented into one or more audio segments. One or more text segments is generated, each text segment corresponding to each of the audio segments. For each text segment, one or more phrase candidate values is generated using a textual analysis, and one or more sentence embedding values is generated using a sentence embedding analysis. Next, an average sentence embedding value is calculated using the one or more sentence embedding values. Each of the one or more phrase candidate values is compared to the average sentence embedding value. Each phrase candidate value having a comparison value above a threshold value is labeled as representing a keyword.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
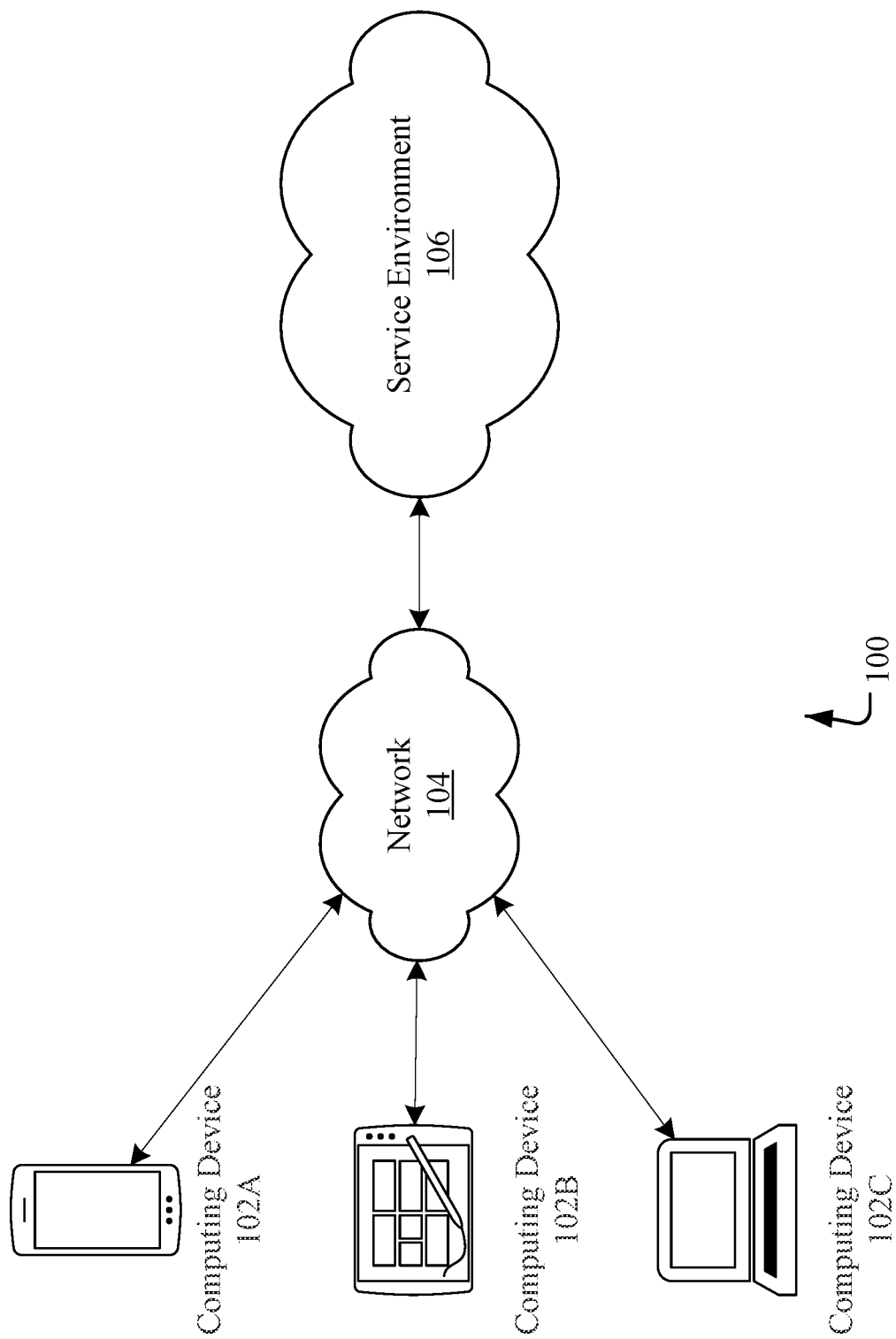
FIG. 1 illustrates an example system for keyword detection for audio content.

Audio content, or a video including audio content, may be uploaded to online platforms, such as a social media platform. Examples of such social media platforms include LinkedIn, Facebook, YouTube, and the like. The processing of the data within the audio content to extract keywords may be used to associate hashtags, searchable keywords, or other such pieces of information, with the audio content or video in which the audio content is included. Systems and methods to extract keywords from audio content are described herein. The present disclosure provides, in one aspect, systems and methods to extract these keywords, and present them to a user, as the video and/or audio content is streaming, such as during playback or during a livestream.

In prior methods, a speech to text (STT) model is applied to all of the audio data collected from a complete clip of audio content. By contrast, the present systems and methods apply various models described herein on segments of audio content as they are manifest in a stream (e.g. playback or livestream). In some implementations, the systems and methods described herein are implemented in a web-based environment, such as via a web browser on a computing device such as a desktop computer, laptop computer, tablet, cellular phone, or the like. In implementations, the systems and methods are implemented using, or carried out on, the computing device.

In some implementations, a user is presented with the extracted keywords, (e.g., as hashtags or tags), as the audio content (e.g., in video content) is streamed (e.g., played back or livestreamed). In this way, the keywords presented are extracted as the audio content is streamed. In some implementations, the keywords presented to the user are not be the keywords ultimately associated with the audio and/or video content when streaming is finished. In implementations, the keywords are not generated from audio data batched at the end of playback, but are generated utilizing data aggregated as the stream progresses (e.g., continuously).

In some implementations, various light-weight models are applied to a stream of audio from a livestream or from a playback of a clip that includes audio content in order to process the audio content. A light-weight model, as used herein, refers to a software model that is configured to have a small memory footprint and low CPU usage. In this way, processing of the audio content will still be possible if there are limited resources (e.g., memory and processor capacity) available to a device, such as if this processing of audio content is done in an online or on-device environment, because it will not rely on heavy-weight models that require greater resources. In one example, resources for a device may be limited when the device is actively consuming resources or has previously allocated resources for other tasks (manifesting as high CPU or memory usage, which results in only a limited amount of CPU or memory being available). In another example, resources for a device may be limited due to hardware failure (e.g., failed CPU cores, memory segments, or disk blocks).

In some implementations, a segment of audio content from the full set of audio content is processed using a STT model. The full set of audio content may be segmented to provide segment(s) of audio content using any method or paradigm for segmenting audio content, such as utilizing a predetermined data size, a predetermined amount of time, a stopword model, and the like. In an example implementation, the full set of audio content is a livestream or a recorded video, and the segments of that audio content are segments of some size that are captured as the audio content streams. In implementations, the processing of the audio content to extract keywords is performed segment by segment as playback of the audio content progresses.

Referring now to FIG. 1, an example implementation of a system for keyword detection for audio content is illustrated. Example system 100 comprises computing devices 102A, 102B, and 102C (collectively "computing device(s) 102"), network 104, and service environment 106. One of skill in the art will appreciate that the scale and structure of systems such as system 100 may vary and may include additional or fewer components than those described in FIG. 1. As one example, system 100 may comprise additional networks and/or service environments. As another example, service environment 106 may be implemented in one or more of computing device(s) 102. Examples of computing device(s) 102 include personal computers (PCs), mobile devices (e.g., smartphones, tablets, laptops, personal digital assistants (PDAs)), server devices (e.g., web servers, file servers, application servers, database servers), virtual devices, wearable devices (e.g., smart watches, smart eyewear, fitness trackers, smart clothing, body-mounted devices, head-mounted displays), gaming consoles or devices, and Internet of Things (IoT) devices. Examples of network 104 include a private area network (PAN), a local area network (LAN), a wide area network (WAN), and the like. Although network 104 is depicted as a single network, it is contemplated that network 104 may represent several networks of similar or varying types. As one example, network 104 may be a LAN connecting computing device(s) 102 to a proxy device and a WAN connecting the proxy device to other one or more services or back-end devices.

Computing device(s) 102 may be configured to detect and/or collect input data from one or more users or devices. In some examples, the input data corresponds to user interaction with one or more software applications or services implemented by, or accessible to, computing device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of an activity, such as a task, a project, or a data request. The input data may include, for example, voice input, touch input, text-based input, gesture input, video input, and/or image input. In one example, the input data is streaming data (e.g., an audio stream or a video stream). In one example, the input data may be a currently uploading data file or a previously uploaded data file. The input data may be detected and/or collected using one or more sensor components of computing device(s) 102. Examples of sensors include microphones, touch-based sensors, geolocation sensors, accelerometers, optical/magnetic sensors, gyroscopes, keyboards, and pointing/selection tools.

Computing device(s) 102 may be further configured to process the input data. In some implementations, computing device(s) 102 process input data into audio segments. In an example implementation, computing device(s) 102 convert the segments of audio content into text segments using speech recognition techniques. In some implementations, computing device(s) 102 generate a list of phrases and corresponding sentence embeddings for the text segments. In some such implementations, computing device(s) 102 then generate a set of values representing an average sentence embedding for the sentence embeddings using the values associated with each sentence embedding. In some implementations, the values of the average sentence embeddings are compared to the values of the sentence embeddings on the computing device(s) 102 to determine a set of phrase candidates from the list of phrases. In some such implementations, one or more of the phrase candidates are then labeled as keywords for the input data. In some examples, computing device(s) 102 display the keywords using an interface, such as a graphical user interface (GUI), of the computing device(s) 102. In various examples, the keywords are displayed in real-time (e.g., as the input data are being processed), after a portion of the input data have been processed, or after the input data have been processed. In other examples, computing device(s) 102 provide the keywords to one or more other locations, such as service environment 106, via network 104.

Service environment 106 is configured to provide computing device(s) 102 access to various computing services and resources (e.g., applications, devices, storage, processing power, networking, analytics, intelligence). Service environment 106 may be implemented in a cloud-based or server-based environment using one or more computing devices, such as server devices (e.g., web servers, file servers, application servers, database servers), PCs, virtual devices, and mobile devices. These computing devices may comprise one or more sensor components, as discussed with respect to computing device(s) 102. Service environment 106 may comprise numerous hardware and/or software components and may be subject to one or more distributed computing models or services (e.g., Infrastructure as a Service (IaaS), Platform as a Service (PaaS), Software as a Service (SaaS), Functions as a Service (FaaS)). In some examples, service environment 106 provides input data to computing device(s) 102 and/or stores keywords received from computing device(s) 102. In at least one example, computing device(s) 102 use service environment 106 to process, at least in part, the input data.

Figure 2:
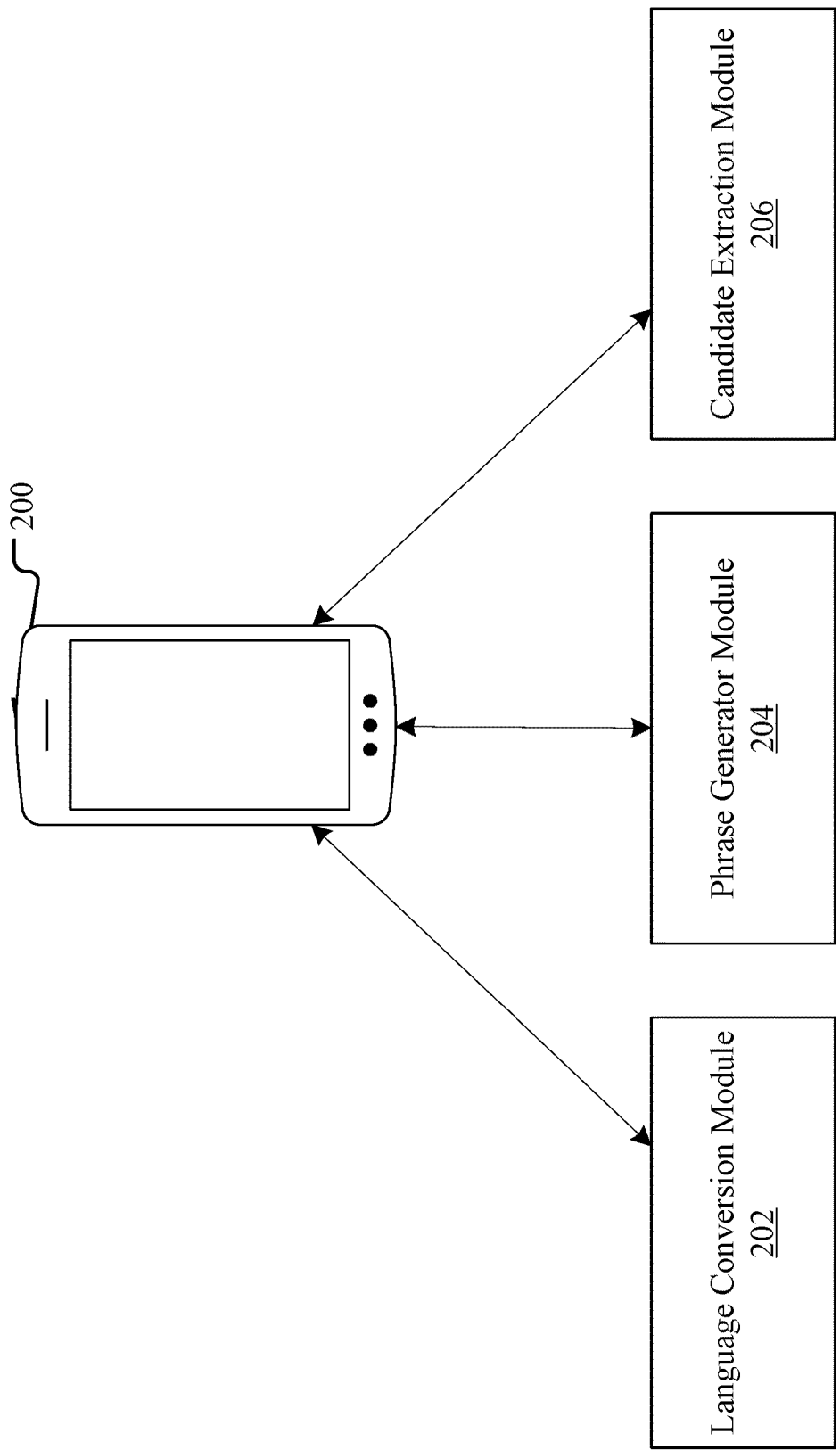
FIG. 2 illustrates an example computing device for keyword detection for audio content.

Referring to FIG. 2, a computing device 200 including modules is illustrated. According to an implementation, a language conversion module 202 is configured to segment audio content into a plurality of audio segments and to generate a text segment for each of the plurality of audio segments. Any suitable audio segmentation technique can be used to segment the audio content, such as utilizing a predetermined data size, a predetermined amount of time, a stopword model, and the like. Any suitable text segment generation technique can be used to generate a text segment for each of the plurality of audio segments; for example, time-based methods that a predetermined interval (e.g., every two seconds), size-based methods that use a predetermined data size (e.g., every 4K bytes), and/or various preprocessing methods, such as voice activity detection (VAD) and the like.

In implementations, a phrase generator module 204 is configured, for each text segment, to create at least one phrase segment using, e.g., a stopword analysis. Any suitable stopword analysis can be used to create at least one phrase segment for each text segment. In examples, a stopword analysis is used to separate phrases based on certain words encountered in each text segment, such as "a," "and," "the," "on," or the like. The phrase generator module 204 is also configured, for each text segment, to create at least one sentence embedding including a set of values. Any suitable sentence embedding technique can be used to create at least one sentence embedding for each text segment, where each sentence embedding includes a set of values. As an example, a sentence embedding model can be used to create representations of text segments and their semantic information as vectors or matrices. The phrase generator module 204 aggregates the phrase segments for each text segment to create a set of phrase candidates. The phrase generator module 204 also aggregates the sentence embeddings for each text segment to create a set of sentence embeddings. In examples, each phrase candidate in the set of phrase candidates corresponds to a sentence embedding in the set of sentence embeddings. As a specific example, a phrase candidate for a text segment is added to a set of phrase candidates and a sentence embedding for the text segment is added to a set of sentence embeddings. The phrase candidate is stored in the set of phrase candidates such that the phrase candidate is identified as being associated with the sentence embedding stored in the set of sentence embeddings and/or the sentence embedding is stored in the set of sentence embeddings such that the sentence embedding is identified as being associated with the phrase candidate stored in the set of phrase candidates. For instance, the phrase candidate and the sentence embedding may be stored with corresponding identifiers, such as a hash value or segment number of the text segment. Alternatively, the phrase candidate and the sentence embedding may be stored in the same row number in their respective aggregated sets.

The phrase generator module 204 calculates an average sentence embedding value for the set of values for each sentence embedding. In various implementations, the average sentence embedding value is an accurate average (e.g., the embedding of the text segments divided by the number of segments) or a moving average. In implementations that use non-embedding models, phrase candidates may be chosen by using any suitable model such as Rapid Automatic Keyword Extraction (RAKE), TextRank, TopicRank, Yet Another Keyword Extractor (YAKE!), ExpandRank, and the like. In another implementation, an average sentence embedding value is calculated by using any suitable model such as Bidirectional Encoder Representations from Transformers (BERT), Word2Vec, A Lite BERT (ALBERT), Universal Sentence Encoder, Sentence BERT, Infersent, and the like.

In implementations, a candidate extraction module 206 is configured to compare the set of values for the set of phrase candidates to the average sentence embedding value. For each phrase candidate in the set of phrase candidates having a comparison value above a threshold value, the candidate extraction module 206 is configured to label the phrase candidate as a keyword. In implementations, the comparison of the set of values for the set of phrase candidates to the average sentence embedding value includes finding the cosine similarity, which may further include finding the dot product where the comparison may be based on the direction of the vectors, and a value of "1" indicates a strong similarity. In still other implementations, the comparison of the set of values for the set of phrase candidates to the average sentence embedding value includes finding the Euclidian distance between each value in the set of values for the set of phrase candidates and the average sentence embedding value. In some implementations, the threshold value is a fixed value. In some implementations, the threshold value is a set of the top phrase candidates at any given time in the processing of the audio content. In still other implementations, the threshold value is determined using methods that estimate the distribution of the distance values.

In implementations, a phrase candidate that is labeled as a keyword during a first time period in the audio content can, as the audio content progresses, be unlabeled as a phrase candidate (e.g., the keyword label can be removed from the set of phrase candidates). This may be for the reason that, as the audio content progresses, the relevancy of a particular keyword may change (e.g., diminish) as new audio content is processed in light of the expanding data set. For instance, at a first time while the audio content progresses, a first set of keywords are identified based on a first portion of the audio content that has been processed up to that point. The first set of keywords are displayed while the audio content progresses via a user interface of computing device 200. The display order of the first set of keywords indicates the relevancy of each keyword in the first set of keywords to the audio content. As one example, the first set of keywords may be arranged in descending order of relevancy to the audio content. At a second time while the audio content progresses, additional audio content is processed and a second set of keywords are identified based on the additional audio content. The second set of keywords, which may include one or more keywords in the first set of keywords, are displayed via the user interface. The display order of the second set of keywords may be such that keywords in the second set of keywords displace or replace keywords in the first set of keywords or cause the order of keywords in the first set of keywords to be reordered. In still another implementation, when the audio content has concluded streaming, a set of final keywords, labeled as phrase candidates, is presented to the user.

Having described one or more systems that may be employed by the aspects disclosed herein, this disclosure will now describe a method that may be performed by the various aspects. In implementations, method 300 may be executed by a system, such as system 100 of FIG. 1. However, method 300 is not limited to such examples. In other implementations, method 300 is performed by a single device, such as computing device 200, or by a single component that integrates the functionality of the components of computing device 200. In at least one implementation, method 300 is performed by one or more components of a distributed network, such as a web service or a cloud service.

Figure 3:
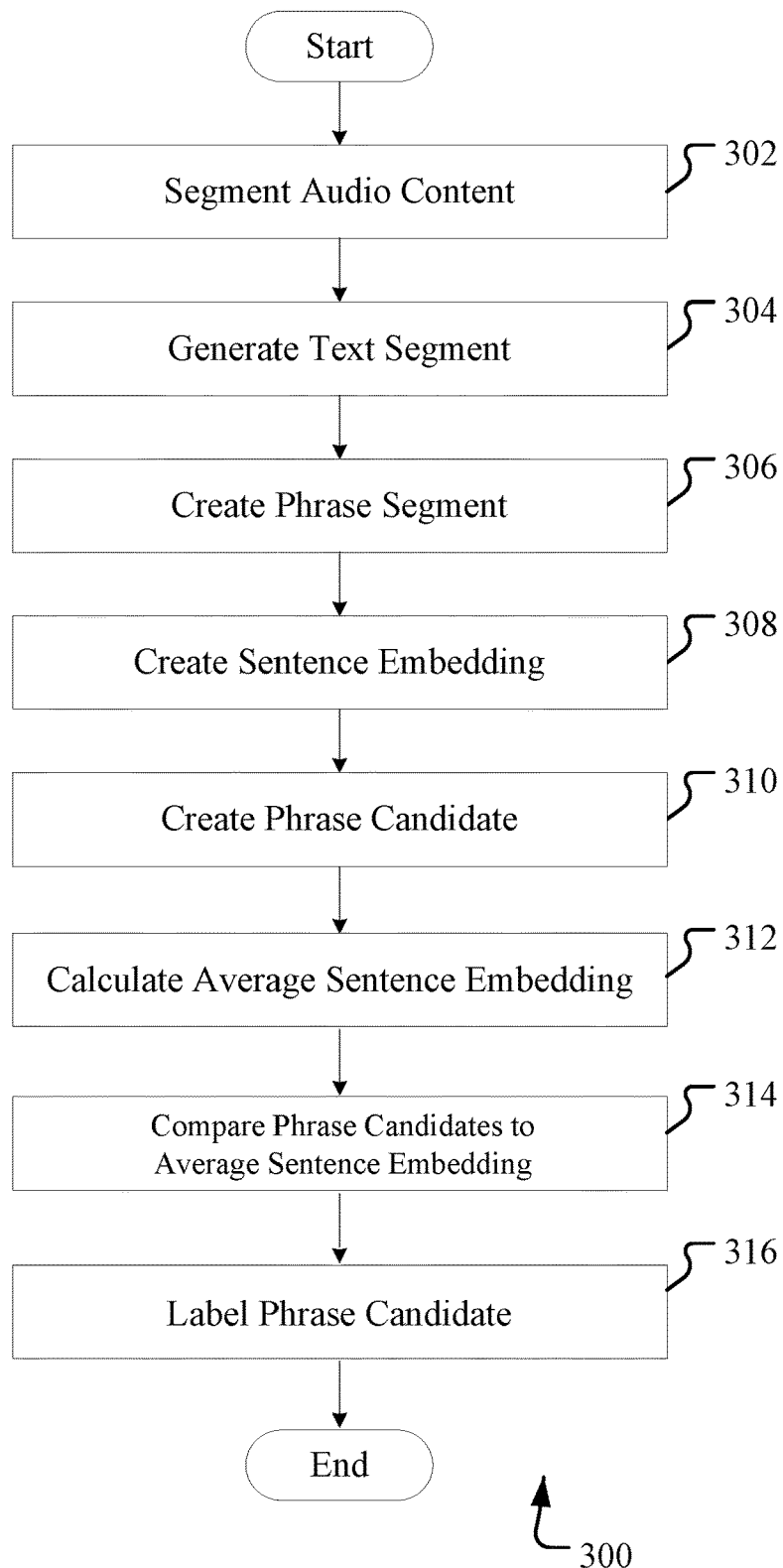
FIG. 3 illustrates an example process flow for keyword detection for audio content.

Referring to FIG. 3, an example method for keyword detection for audio content is illustrated. Example method 300 begins at operation 302, where audio content is segmented into a plurality of audio segments. As one example, a computing device, such as computing device(s) 102, receives audio content representing speech. A data segmentation component, such as language conversion module 202, separates the audio content into a plurality of audio segments using an audio segmentation technique, such as a distance function (e.g., Gish distance, entropy loss, t-squared distance) or a machine learning (ML) algorithm (e.g., hidden Markov model (HMM), Gaussian mixture model (GMM), support vector machine (SVM)). For instance, an audio content stream (representing multiple gigabytes of data) may be separated into one megabyte audio segments.

At operation 304, a text segment is generated for each of the plurality of audio segments. In examples, the data segmentation component converts the plurality of audio segments into corresponding text segments using a text segment generation technique, such as a speech recognition model (e.g., artificial neural networks model, vector quantization model, dynamic time warping model). For instance, a speech recognition model may convert an audio segment such that a speech portion of the audio segment is transcribed into a corresponding text segment and a non-speech portion of the audio segment (e.g., wordless music or other background sounds) is not transcribed. Alternatively, the speech recognition model may convert the audio segment into multiple text segments that collectively correspond to the audio segment. For instance, the multiple text segments may be separated according to a data size parameter (e.g., segment every four kilobytes), according to a time parameter (e.g., segment every two second interval), or according to any other parameter.

At operation 306, at least one phrase segment is created for each text segment. In examples, a data analysis component, such as phrase generator module 204, creates at least one phrase for each text segment using a text mining technique (e.g., an agglomerative algorithm, a fuzzy clustering algorithm, a naïve Bayes classifier) or an ML algorithm. In some examples, the text mining technique or ML algorithm implements stopword analysis. For instance, the data analysis component may use a stopword analysis to convert the text segment "When was the first computer invented?" into the phrase "first computer invented." As another example, the data analysis component may use a stopword analysis to convert the text segment "I want to go on a hike tomorrow, but it is going to rain for at least six hours" into the phrases "hike tomorrow" and "rain six hours."

At operation 308, at least one sentence embedding is created for each text segment. In examples, the data analysis component creates at least one sentence embedding for each text segment using a sentence embedding model, such as a bag-of-words model, a pooled word embedding model (e.g., Word2Vec model, smooth inverse frequency (SIF)), or a contextual full sentence embedding model (e.g., Bidirectional Encoder Representations from Transformers (BERT) model, Language-Agnostic SEntence Representations (LASER) model). For instance, the data analysis component may use a sentence embedding model to create a vector representation of a text segment. The vector representation may comprise features such as text and metrics data (e.g., word counts, character counts, average word length) for a text segment.

At operation 310, a set of phrase candidates is created from the phrase segments. In examples, the data analysis component aggregates the phrase segments created for each text segment into a set of aggregated phrase segments. Aggregating the phrase segments may create a list, cluster, or other grouping of the phrase segments. The data analysis component creates a set of phrase candidates from the set of aggregated phrase segments using a statistical analysis technique, such as RAKE, TextRank, or TopicRank. As one example, the data analysis component counts the occurrences of each word or phrase in the phrase segments to determine a frequency score for each word or phrase. For instance, the phrase "machine learning" may appear 35 times and be assigned a frequency score of 35, the phrase "computer vision" may appear 15 times and be assigned a frequency score of 15, and so on. A word or phrase having a frequency score below a threshold value, such as 5 (representing five (5) occurrences of a word or phrase), may be removed from or not considered in the set of aggregated phrase segments. Based on the statistical analysis technique, a set of phrase candidates is selected from the set of aggregated phrase segments. As one example, the top 'N' or 'N'% of the phrase segments may be selected from the set of aggregated phrase segments as phrase candidates.

At operation 312, an average sentence embedding is calculated from the sentence embeddings. In examples, the data analysis component aggregates the sentence embeddings created for each text segment into a set of aggregated sentence embeddings. Aggregating the sentence embeddings may create a list, cluster, or other grouping of the sentence embeddings. The data analysis component determines an average sentence embedding from the set of aggregated sentence embeddings using a sentence embedding model. As one example, the data analysis component calculates an average of the vector representations of the text segments. The average of the vector representations (represented by an averaged vector representation) corresponds to the average sentence embedding for the set of aggregated sentence embeddings.

At operation 314, the set of phrase candidates is compared to the average sentence embedding. In examples, a comparison component, such as candidate extraction module 206, compares the sentence embedding of each phrase candidate in the set of phrase candidates to the average sentence embedding calculated at operation 312. Comparing a sentence embedding to the average sentence embedding may include calculating a cosine similarity to determine the distance between the sentence embedding and the average sentence embedding. For instance, the cosine similarity may represent the angle between the vector representation of the sentence embedding and the vector representation of the average sentence embedding (e.g., the dot product of the vector representations) divided by the product of the vector representations' lengths. In such an example, two proportional vectors (e.g., having a similar direction and/or length) have a cosine similarity of 1, two orthogonal vectors have a similarity of 0, and two opposite vectors have a similarity of −1. Alternatively, comparing a sentence embedding to the average sentence embedding may include calculating the Euclidian distance between the sentence embedding and the average sentence embedding.

At operation 316, one or more phrase candidates are labeled as keywords. In examples, the comparison component compares the similarity value between a sentence embedding and the average sentence embedding (e.g., the cosine similarity or the Euclidian distance) to a threshold value to determine whether the phrase candidate corresponding to the sentence embedding is to be labeled as a keyword. For instance, if a similarity value associated with a sentence embedding meets or exceeds the threshold value, the phrase candidate corresponding to the sentence embedding is labeled as a keyword. Conversely, if a similarity value associated with a sentence embedding does not exceed the threshold value, the phrase candidate corresponding to the sentence embedding is not labeled as a keyword.

In examples, a list of keywords for audio content is provided to one or more users. For instance, the list of keywords may be presented in a user interface (UI) of a service or application that is receiving the audio content. Alternatively, the list of keywords may be presented in a popup, an organization internal feed, an email message, a text message, or the like. The list of keywords may be arranged in an order of relevance to the audio content. In embodiments, the list of keywords is arranged in a descending order of similarity value to indicate the descending relevance of the keywords to the audio content. As a specific example, each keyword in the list of keywords is listed along with the similarity value for the keyword (e.g., "machine learning", 0.55), and the list of keywords is arranged in a descending order of similarity value to indicate the descending relevance of the keywords to the audio content.

In some implementations, as the streaming of the audio content progresses, the average sentence embedding value may change. For example, as audio content continues to be received and processed to create additional phrase segments and sentence embeddings, the average sentence embedding may be recalculated periodically (e.g., every 5 seconds or every 50 MB of audio content is received) or continually. The recalculation of the average sentence embedding ensures that keywords applicable to the current context of the audio content continue to be provided. In such examples, the list of keywords provided or the order of list of keywords may change over time (e.g., keywords may be moved up or down in the list, added to the list, removed from the list). For instance, at a first time, a first set of keywords may be identified based on a first portion of the audio content that has been processed up to that point. At a second time, after additional audio content has been processed, a second set of keywords may be identified based on the additional audio content and/or the first portion of the audio content. In the additional audio content, one or more of the keywords in the first set of keywords may have been used infrequently or not used at all. As such, text derived from the additional audio content may be determined to be more relevant to or prevalent in the audio content than those keywords in the first set of keywords. As a result, one or more keywords are derived from the text of the additional audio content. The keyword(s) derived from the additional audio content are added to the first set of keywords or used to generate a second set of keywords. The first or second set of keywords is then (re)ordered such that the most relevant or prevalent keywords as of the second time are positioned higher in list of the set of keywords than less relevant or prevalent keywords. In one example, the set of keywords includes only the top 'N' most relevant or prevalent keywords, such that any keywords below the 'N'th entry are removed from the set of keywords. FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration, and, as is understood, a vast number of computing device configurations may be utilized for practicing aspects of the disclosure, described herein.

Figure 4:
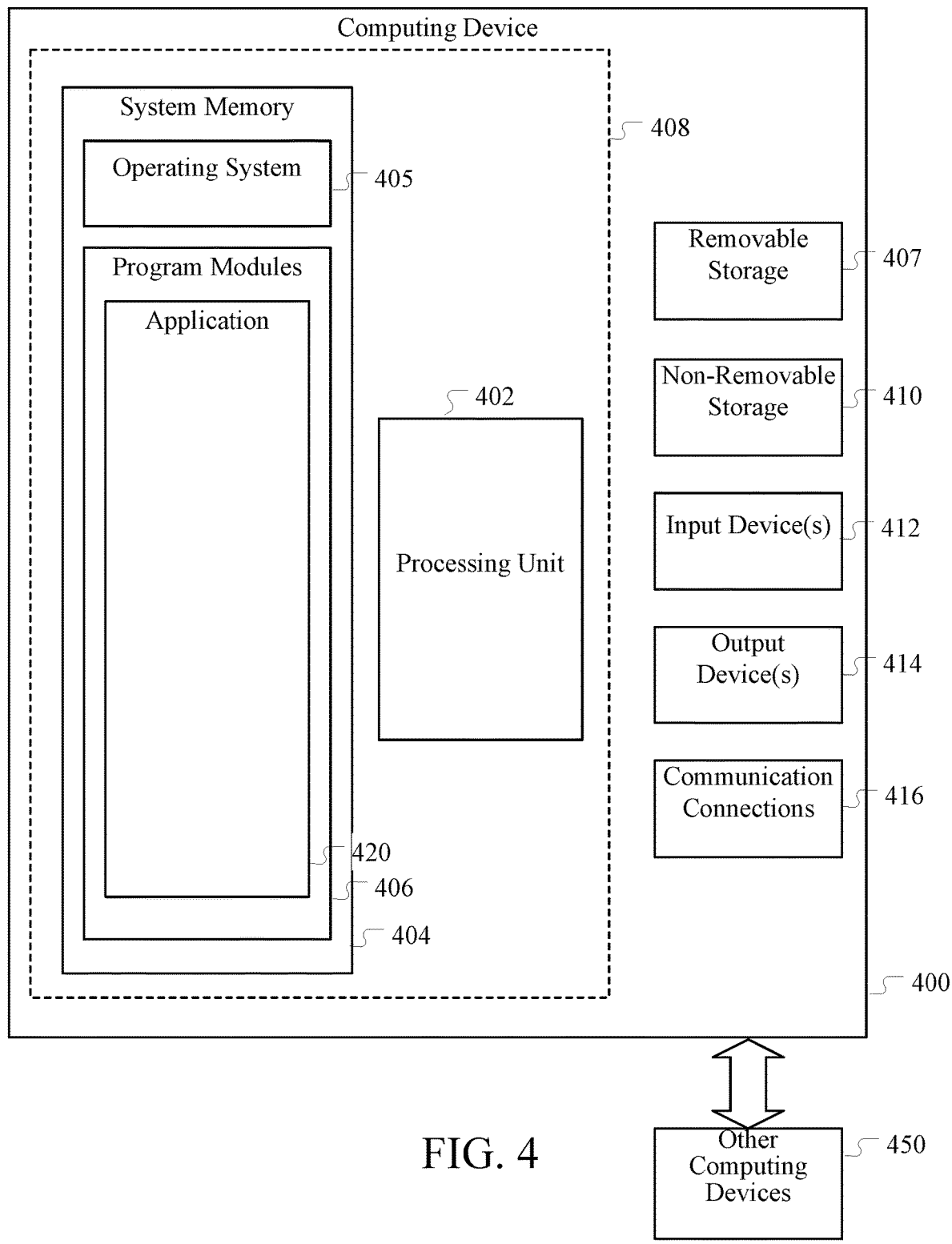
FIG. 4 is a block diagram illustrating example physical components of a computing device for executing one or more aspects of the present disclosure.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing unit 402 and a system memory 404. Depending on the configuration and type of computing device, the system memory 404 may comprise volatile storage (e.g., random access memory), non-volatile storage (e.g., read-only memory), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, tape, and other computer readable media. Such additional storage is illustrated in FIG. 4 by a removable storage device 407 and a non-removable storage device 410.

As stated above, a number of program modules and data files may be stored in the system memory 404. While executing on the processing unit 402, the program modules 406 (e.g., application 420) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, a gesture input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include radio frequency (RF) transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 404, the removable storage device 407, and the non-removable storage device 410 are all computer readable media examples (e.g., memory storage). Computer readable media includes random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer readable media may be part of the computing device 400. Computer readable media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, communication media includes wired media such as a wired network or direct-wired connection, and wireless media such as acoustic, RF, infrared, and other wireless media.

Figure 5A:
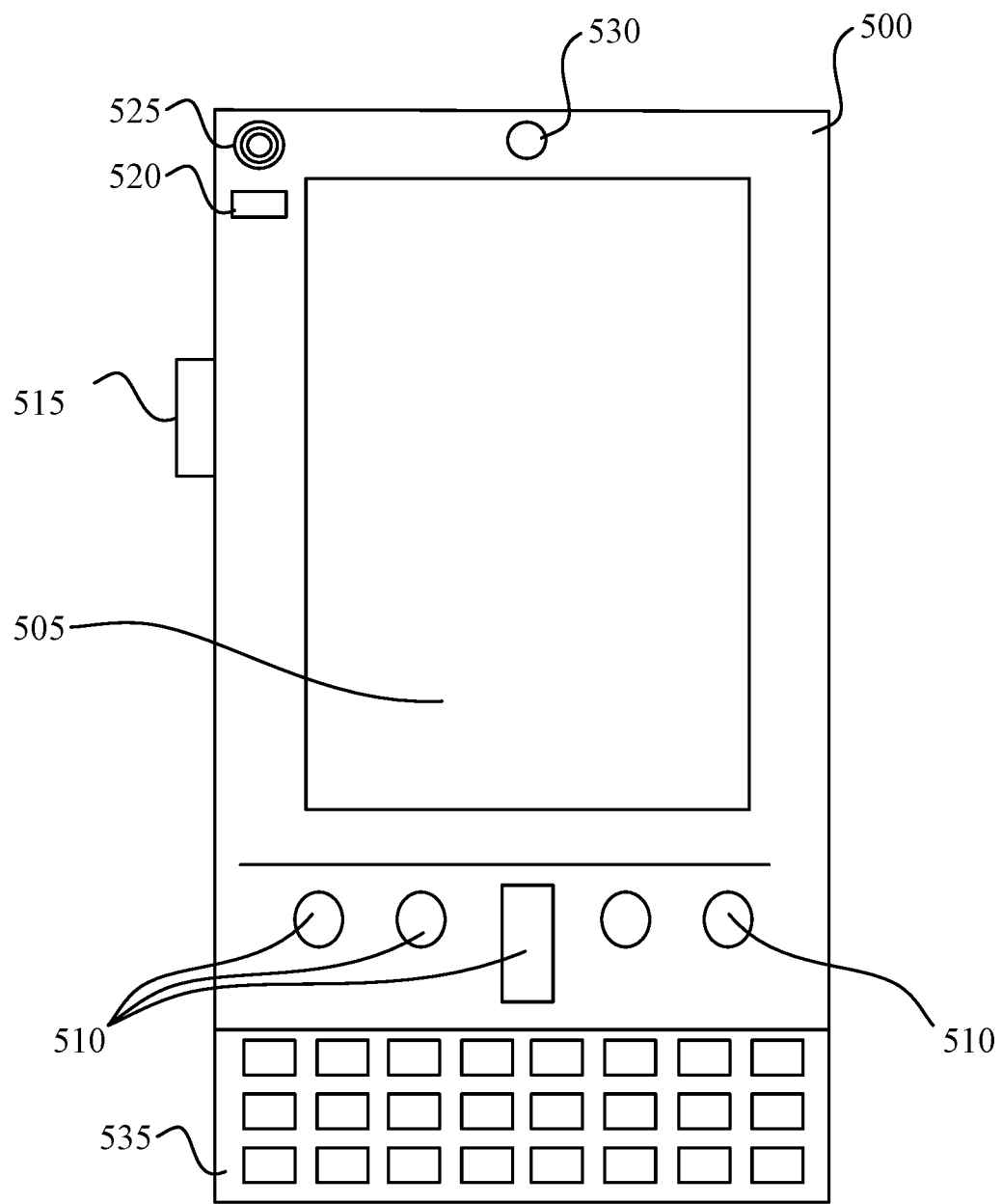
FIGS. 5A and 5B are an illustration and a simplified block diagram, respectively, of an example mobile computing device for practicing aspects of the present disclosure.
Figure 5B:
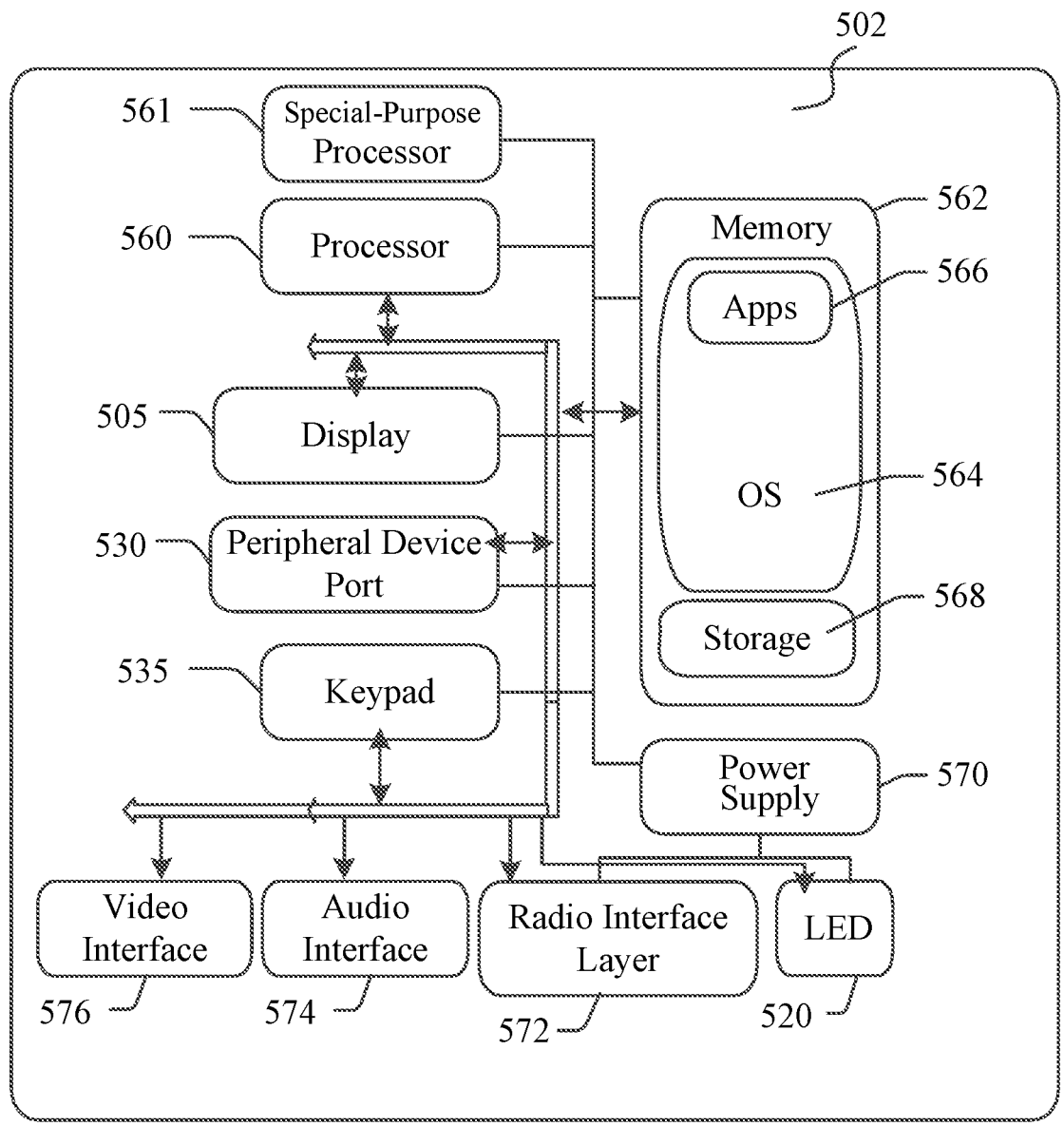

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the computing device may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display).

The mobile computing device 500 also includes peripheral device port 530 (e.g., an on-board camera). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments.

In embodiments, the mobile computing device 500 is a portable phone system, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator (e.g., light emitting diode (LED) 520) may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of a peripheral device port 530 (e.g., an on-board camera) to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data generated or captured by the mobile computing device 500 and stored via the system 502 may be stored locally on the mobile computing device 500, as described above. Alternatively, the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
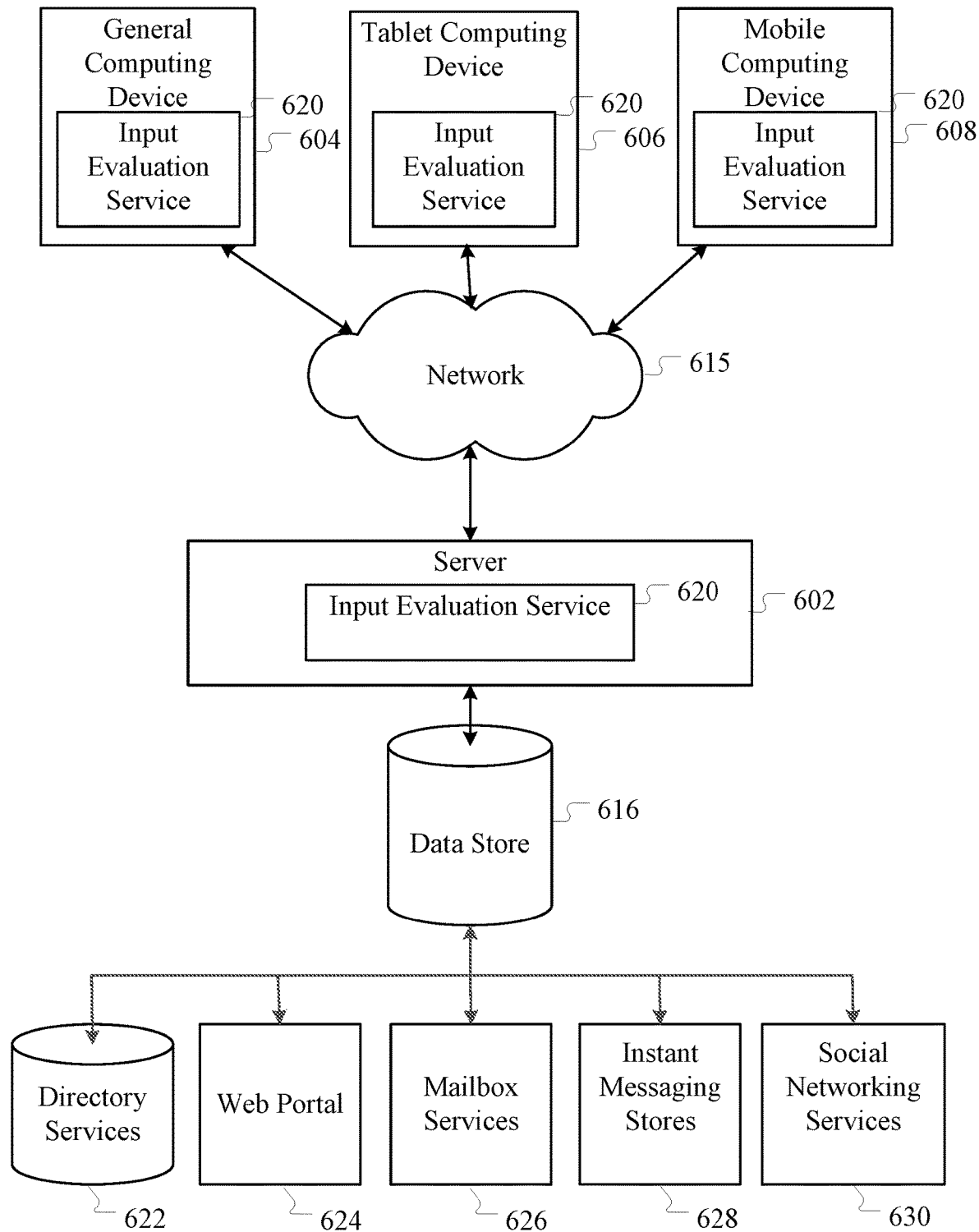
FIG. 6 is a simplified block diagram of an example distributed computing system for practicing aspects of the present disclosure.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory services 622, a web portal 624, mailbox services 626, instant messaging stores 628, or social networking services 630.

An input evaluation service 620 may be employed by a computing device that communicates with server device 602, and/or input evaluation service 620 may be employed by server device 602. The server device 602 may provide data to and from a computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data or audio data useable to be either pre-processed at a graphic-originating system or audio-originating system, or post-processed at a receiving computing system.

Figure 7:
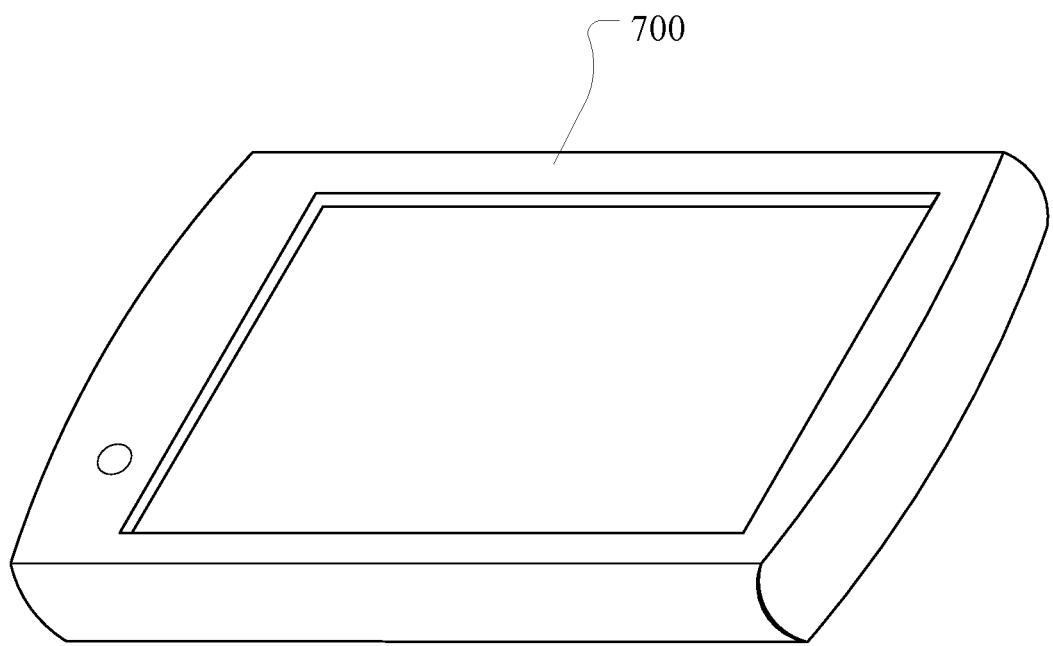
FIG. 7 illustrates an example tablet computing device for executing one or more aspects of the present disclosure.

FIG. 7 illustrates an example of a tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one example of the technology relates to a computer-implemented method. The method for detecting keywords for audio content comprises segmenting audio content into a plurality of audio segments. A plurality of text segments is generated, each text segment corresponding to each of the audio segments. A plurality of phrase candidate values is generated using a textual analysis of the plurality of text segments and a plurality of sentence embeddings values is generated using a sentence embedding analysis of the plurality of text segments. An average sentence embedding value is calculated using the plurality of sentence embedding values. Each of the plurality of phrase candidate values is compared to the average sentence embedding value, and each phrase candidate value having a comparison value above a threshold value is labeled as representing a keyword.

In another example, the technology relates to a system comprising a language conversion module stored in memory and executable to segment audio content into one or more audio segments and to generate one or more text segments, each text segment of the plurality of text segments corresponding to a particular audio segment of the plurality of audio segments. The system also comprises a phrase generator module configured to, for each text segment, generate one or more phrase candidate values using a textual analysis, generate one or more sentence embedding values using a sentence embedding analysis, and calculate an average sentence embedding value using the one or more sentence embedding values. The system also comprises a candidate extraction module configured to compare each of the one or more phrase candidate values to the average sentence embedding value and to label each phrase candidate value having a comparison value above a threshold value as representing a keyword.

In another example, the technology relates to a device comprising a processor and a memory coupled to the processor. The memory may comprise computer executable instructions that, when executed by the processor, performs a method comprising segmenting audio content into one or more audio segments. One or more text segments is generated, each text segment corresponding to each of the audio segments. For each text segment, one or more phrase candidate values is generated using a textual analysis, and one or more sentence embedding values is generated using a sentence embedding analysis. An average sentence embedding value is calculated using the one or more sentence embedding values. Each of the one or more phrase candidate values is compared to the average sentence embedding value, and each phrase candidate value having a comparison value above a threshold value is labeled as representing a keyword. The phrase candidates listed as keywords are caused to be displayed.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for detecting keywords for audio content, the method comprising:
    segmenting the audio content into a plurality of audio segments;
    generating a plurality of text segments corresponding to the plurality of audio segments;
    generating a plurality of phrase candidate values using a textual analysis of the plurality of text segments;
    generating a plurality of sentence embedding values using a sentence embedding analysis of the plurality of text segments;
    calculating an average sentence embedding value using the plurality of sentence embedding values;
    comparing each phrase candidate value of the plurality of phrase candidate values to the average sentence embedding value;
    labeling each phrase candidate value having a comparison value above a threshold value as a keyword; and
    presenting the keyword as a stream of the audio content progresses.

2. The method of claim 1, wherein the detecting keywords for audio content occurs during playback of the audio content.

3. The method of claim 1, wherein the average sentence embedding value approaches the threshold value as playback of the audio content progresses.

4. The method of claim 1, wherein each text segment of the plurality of text segments corresponds to an audio segment in the plurality of text segments.

5. The method of claim 1, wherein video content comprises the audio content.

6. The method of claim 1, wherein the textual analysis comprises a stopword analysis.

7. The method of claim 1, wherein the plurality of sentence embedding values comprise a plurality of vectors, respectively.

8. The method of claim 1, wherein the threshold value is a predetermined value based on relevance.

9. A system for detecting keywords for audio content, the system comprising:
    a language conversion module stored in memory and executable to segment audio content into a plurality of audio segments and to generate a plurality of text segments, each text segment of the plurality of text segments corresponding to a particular audio segment of the plurality of audio segments;
    a phrase generator module stored in the memory and executable to: generate a plurality of phrase candidate values using a textual analysis of the plurality of text segments, generate a plurality of sentence embedding values using a sentence embedding analysis of the plurality of text segments, and calculate an average sentence embedding value using the plurality of sentence embedding values; and
    a candidate extraction module stored in the memory and executable to: compare each of the plurality of phrase candidate values to the average sentence embedding value, and to label each phrase candidate value having a comparison value above a threshold value as representing a keyword, and present the keyword as a stream of the audio content progresses.

10. The system of claim 9, wherein the average sentence embedding value approaches the threshold value as playback of the audio content progresses.

11. The system of claim 9, wherein the language conversion module, the phrase generator module, and the phrase candidate extraction module are stored in the memory on a personal computing device.

12. The system of claim 9, wherein the audio content comprises a livestream.

13. The system of claim 9, wherein each text segment of the plurality of text segments exists in a one-to-one relationship with an audio segment in the plurality of audio segments.

14. A device comprising:
    a processor; and
    memory coupled to the processor, the memory comprising computer executable instructions that, when executed by the processor, perform operations comprising:
        segmenting audio content into one or more audio segments;
        generating one or more text segments, each text segment corresponding to each of the audio segments;
        for each text segment:
        generating one or more phrase candidate values using a textual analysis; and
        generating one or more sentence embedding values using a sentence embedding analysis;
        calculating an average sentence embedding value using the one or more sentence embedding values;
        comparing each of the one or more phrase candidate values to the average sentence embedding value;
        labeling each phrase candidate value having a comparison value above a threshold value as representing a keyword; and
        presenting the keyword as a stream of the audio content progresses.

15. The device of claim 14, wherein the audio content comprises a livestream.

16. The device of claim 14, wherein the operations are performed during playback of the audio content, and wherein the average sentence embedding value approaches the threshold value as playback of the audio content progresses.

17. The device of claim 14, wherein the textual analysis comprises a stopword analysis.

18. The device of claim 14, wherein the one or more sentence embedding values comprise one or more vectors.

19. The device of claim 14, wherein the threshold value is a predetermined value based on relevance.

20. The device of claim 14, wherein the processor and the memory are comprised on a personal computing device.

* * * * *